(12) United States Patent
Tsengas

(10) Patent No.: US 9,021,989 B2
(45) Date of Patent: May 5, 2015

(54) ULTRASONIC STIMULATING PET TOY

(71) Applicant: Steven Tsengas, Fairport Harbor, OH (US)

(72) Inventor: Steven Tsengas, Fairport Harbor, OH (US)

( * ) Notice: Subject to any disclaimer, the term of this patent is extended or adjusted under 35 U.S.C. 154(b) by 0 days.

(21) Appl. No.: 13/910,634

(22) Filed: Jun. 5, 2013

(65) Prior Publication Data

US 2014/0064504 A1 Mar. 6, 2014

Related U.S. Application Data

(63) Continuation of application No. 11/893,410, filed on Aug. 17, 2007, now Pat. No. 8,474,409.

(51) Int. Cl.
*A01K 29/00* (2006.01)
*A01K 15/00* (2006.01)
*A63H 5/00* (2006.01)
*A01K 15/02* (2006.01)

(52) U.S. Cl.
CPC .................................. *A01K 15/025* (2013.01)

(58) Field of Classification Search
CPC ..... A63H 2200/00; A63H 3/28; A63H 30/04; A63H 33/00; A63H 29/22; A63H 19/24; A63H 33/042; A63H 33/086; A63H 3/10; A63H 3/16; A63H 11/10; A63H 17/262; A63H 18/16; A63H 2019/243; A63H 30/02; A63H 33/006; A63H 33/04; A63H 3/00; A63H 3/02; A63H 3/36; A63H 5/00; A63H 9/00; A01K 15/025; A01K 29/00

USPC .......... 119/707, 709, 710, 711; 446/297, 369, 446/397

See application file for complete search history.

(56) References Cited

U.S. PATENT DOCUMENTS

| | | | | | |
|---|---|---|---|---|---|
| 1,265,926 | A | * | 5/1918 | Ludlam | 426/104 |
| 4,249,338 | A | * | 2/1981 | Wexler | 446/303 |
| 4,318,245 | A | * | 3/1982 | Stowell et al. | 446/303 |
| 4,391,224 | A | * | 7/1983 | Adler | 119/707 |
| 4,551,114 | A | * | 11/1985 | Hyman et al. | 446/397 |
| 4,602,360 | A | * | 7/1986 | Porcelli | 369/63 |
| 4,662,260 | A | * | 5/1987 | Rumsey | 84/653 |
| 5,214,411 | A | * | 5/1993 | Herbruck | 340/573.2 |
| 5,533,920 | A | * | 7/1996 | Arad et al. | 446/409 |
| 5,542,376 | A | * | 8/1996 | Udelle et al. | 119/707 |
| 5,575,240 | A | * | 11/1996 | Udelle et al. | 119/707 |
| 5,634,436 | A | * | 6/1997 | Coombs et al. | 119/707 |
| 5,657,721 | A | * | 8/1997 | Mayfield et al. | 119/707 |
| 5,679,049 | A | * | 10/1997 | Arad et al. | 446/142 |
| 5,785,005 | A | * | 7/1998 | Udelle et al. | 119/706 |
| 5,794,568 | A | * | 8/1998 | Udelle et al. | 119/707 |
| 5,875,736 | A | * | 3/1999 | Udelle et al. | 119/706 |
| 5,876,263 | A | * | 3/1999 | DeCesare et al. | 446/330 |
| 5,934,223 | A | * | 8/1999 | Ellery-Guy | 119/702 |
| 5,975,982 | A | * | 11/1999 | Spector | 446/397 |
| 5,986,551 | A | * | 11/1999 | Pueyo et al. | 340/573.1 |
| 6,000,987 | A | * | 12/1999 | Belin et al. | 446/175 |
| 6,016,100 | A | * | 1/2000 | Boyd et al. | 340/384.2 |
| 6,039,628 | A | * | 3/2000 | Kusmiss et al. | 446/457 |

(Continued)

*Primary Examiner* — Yvonne Abbott-Lewis
(74) *Attorney, Agent, or Firm* — John D Gugliotta

(57) ABSTRACT

The present invention relates generally to an ultrasonic stimulating pet toy and, more specifically, to a mouse-like pet toy comprising a sound chip assembly that emits ultrasonic vocalizations that replicate those studied in mice. The instant abstract is neither intended to define the invention disclosed in this specification nor intended to limit the scope of the invention in any way.

15 Claims, 8 Drawing Sheets

Initial waveform of "squeak".
Freq ~ 6.1KHz; nominal square wave.
Amplitude ~ 6.4Vp-p*

(56) References Cited

U.S. PATENT DOCUMENTS

| | | | |
|---|---|---|---|
| 6,058,887 A * | 5/2000 | Silverman | 119/609 |
| 6,196,893 B1 * | 3/2001 | Casola et al. | 446/297 |
| 6,250,255 B1 * | 6/2001 | Lenhardt et al. | 119/713 |
| 6,273,027 B1 * | 8/2001 | Watson et al. | 119/712 |
| 6,371,053 B1 * | 4/2002 | Tsengas | 119/707 |
| 6,571,742 B1 * | 6/2003 | Tsengas | 119/707 |
| 6,860,240 B2 * | 3/2005 | Kim et al. | 119/719 |
| D512,470 S * | 12/2005 | Sikio | D21/656 |
| 7,116,233 B2 * | 10/2006 | Zhurin | 340/573.1 |
| 7,227,452 B1 * | 6/2007 | Frost | 340/384.2 |
| D568,554 S * | 5/2008 | Lamstein | D30/160 |
| D569,052 S * | 5/2008 | Lamstein | D30/160 |
| 7,377,234 B2 * | 5/2008 | Belcher | 119/720 |
| 7,562,639 B2 * | 7/2009 | Ritchey | 119/708 |
| 2009/0025652 A1 * | 1/2009 | Jong | 119/720 |
| 2009/0120373 A1 * | 5/2009 | Wetzel et al. | 119/719 |
| 2009/0133640 A1 * | 5/2009 | Bai | 119/718 |
| 2009/0205582 A1 * | 8/2009 | Kitchens | 119/719 |

* cited by examiner

Waveform after 5.6 msec has elapsed.
Frequency increases to 6.54KHz.

Waveform after 16.4 msec has elapsed.
Frequency increases to 7.30KHz.

Waveform after 28.3 msec has elapsed.
Frequency increases to 8.26KHz.

Waveform after 40.5 msec has elapsed.
Frequency increases to 9.7KHz.

Waveform after 50.2 msec has elapsed.
Frequency increases to 11.4KHz.
Waveforms from later in the event have not been included.

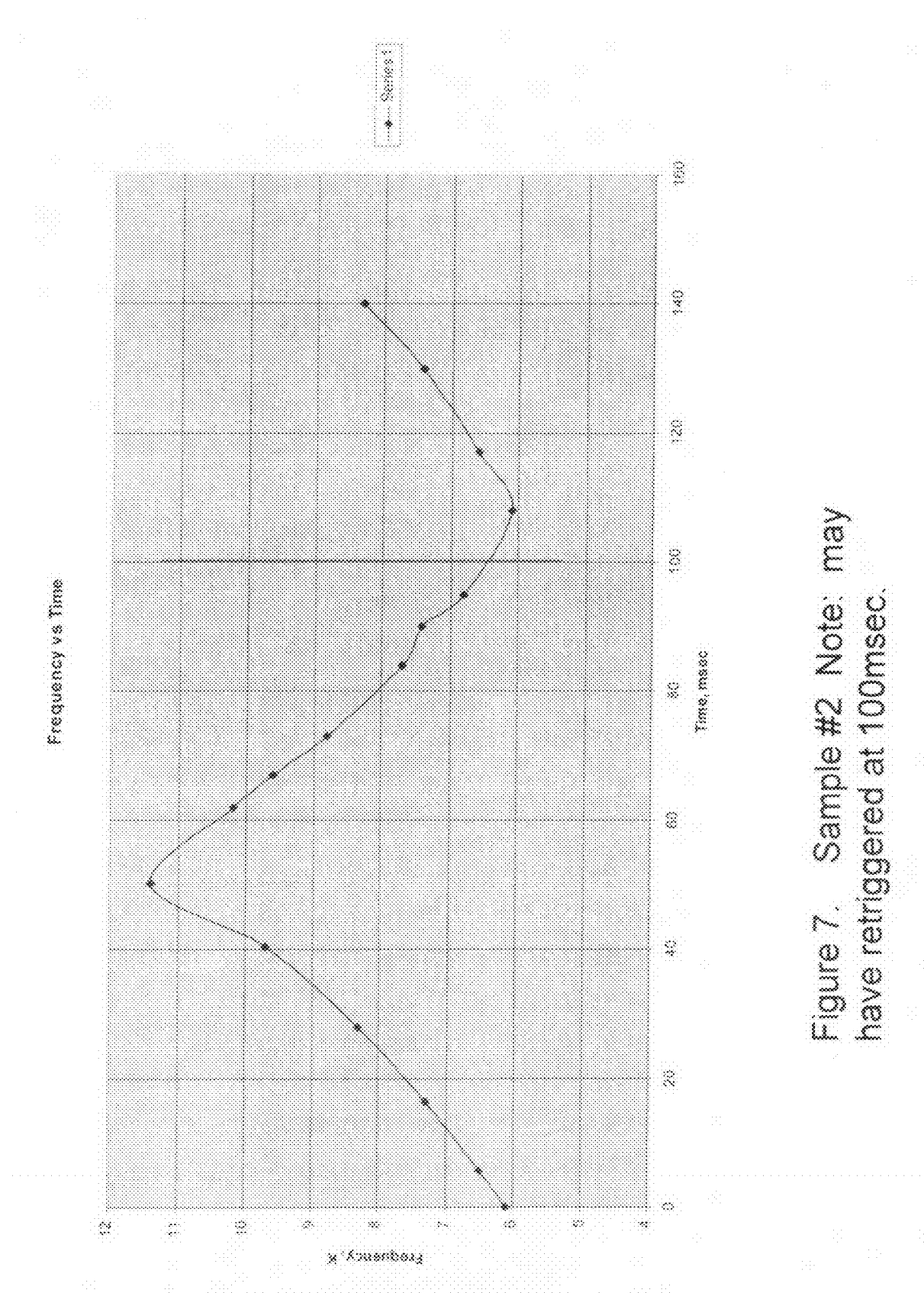
Figure 7. Sample #2. Note: may have retriggered at 100msec.

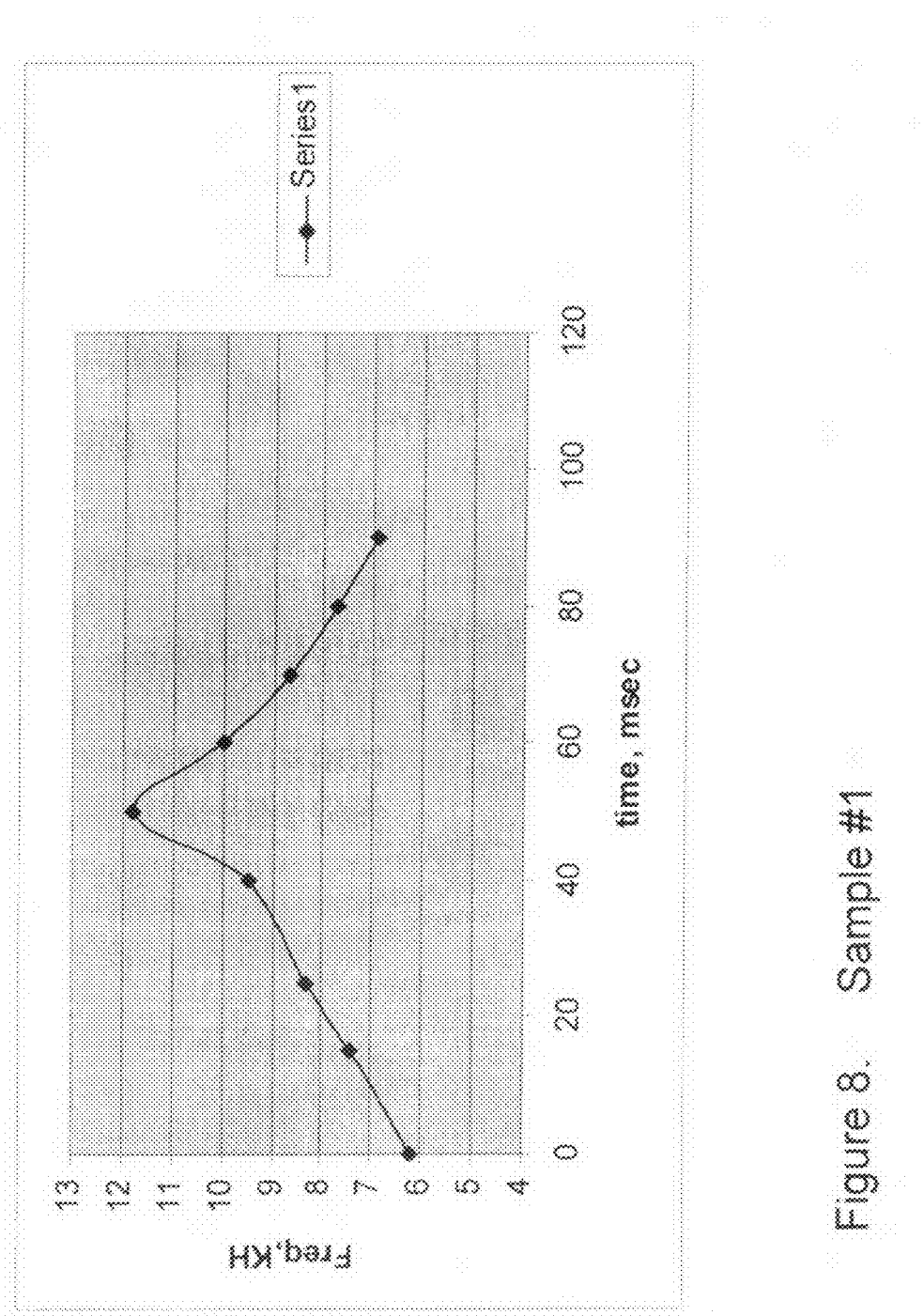
Figure 8. Sample #1

ULTRASONIC STIMULATING PET TOY

RELATED APPLICATIONS

There present invention is a Continuation Application of U.S. Ser. No. 11/893,410, allowed on Apr. 8, 2013 and publication pending. There are no other co-pending applications anywhere in the world.

BACKGROUND OF THE INVENTION

1. Field of the Invention

The present invention relates generally to an ultrasonic stimulating pet toy and, more specifically, to an improved mouse-like pet toy comprising a sound chip assembly that emits ultrasonic vocalizations that stimulate a greater interaction by cats.

2. Description of the Related Art

Domestic cats are specialized hunters whose techniques require crypticity for success. Most domestic animals depend on both acoustic and visual cues to hunt prey; however, an importance of acoustic cues is especially emphasized for cats because they possess better acoustic discrimination abilities than dogs. Cats respond physiologically to higher-pitched sounds; scratches, noises and high-pitched mouse calls act upon an innate releasing mechanism which directs a cat's attention to a source of the sound. It isn't until after the cat's attention is gained when a moving source can elicit any pouncing movement by the cat.

Domestic cats make roving searches of their indoor environments in search of prey. There are many toys known in the art to encourage this natural, instinctive behavior. Other toys aim to also stimulate a cat's pouncing abilities as a form of playful interaction between the cat and a toy.

Because mice and birds are common prey hunted by cats, many of these toys take a form that resembles one of these natural preys. U.S. Pat. No. 6,371,053, to the present inventor, is such a toy, wherein a simulated, cloth mouse comprises a sound chip that emits a prerecorded sound in response to its engagement. Similar toys exist to resemble birds.

Although the high pitched squeak emitted from bird and mice toys appear to sound the same, birds and mice utter distinct and specialized vocalizations. The repetition rates, the number of repetitions, the frequencies and the intricate phrases that quantify the vocalizations vary between the two species. A study of the vocalization sequences made by mice shows that they emit ultrasonic vocalizations that display frequencies having unexpected richness. The present invention is a pet toy that comprises a means to replicate the vocalizations studied in mice, wherein a quantitative description of the studied vocalizations are used as the bases for the toy claimed herein.

SUMMARY OF THE INVENTION

It is an object of the present invention to teach an ultrasonic stimulating pet toy, wherein the pet toy comprises an improved sound emitted therefrom to resemble those emitted by mice.

It is an object of the present invention to comprise a mouse-like appearance such that the cat is encouraged to pounce on the prey after the sound spawns the cat's attention.

It is an object that the present means to emit sound replicates the ultrasonic vocalizations studied in mice. It is an object that the vocalizations produce sounds that stimulate a greater response from cats.

It is an object that the present toy emit ultrasonic vocalizations that utilize frequencies that approach 30 kHz because mice emit frequencies that range over 30-110 kHz.

It is an object that one embodiment of the present toy emit ultrasonic vocalizations that consist of a rapid series of chirp-like syllables in an audible range, preferred to be within the 30-110 kHz band. It is an object that these syllables are of varying length and are uttered at rates that approximate ten syllables per second. It is an object that one embodiment of the present invention comprise pitch-shifts in the vocalizations to be reminiscent of mice birdsong.

It is an object that the present toy be the one on the market that most closely elicits a same response by a cat as would a natural prey. It is an object that the present toy emit vocalizations at frequencies that engage a pet and, more specifically, one that orients the pet towards that locus. It is an object that the present invention is one that effectively exercises a pet when it attracts a pet to playfully pounce on it. It is an object that the present interactive toy stimulates the pet by utilizing both the pet's acoustic and visual cues.

It is a final object that the present invention provide all of the advantages that the foregoing objects entail.

BRIEF DESCRIPTION OF THE DRAWINGS

The advantages and the features of the present invention are better understood with a reference to the following and more detailed description and claims taken in conjunction with the accompanying drawings, in which like elements are identified with like symbols, and in which:

FIG. 7 is a graph representing the frequency of the sound emitted from the present pet toy over a time; and, FIG. 8 is a graph showing the same representation as that in FIG. 8, wherein one "squeak" is measured.

DESCRIPTION OF THE PREFERRED EMBODIMENTS

1. Detailed Description of the Figures

The present invention is an ultrasonic stimulating pet toy. It is preferred that the pet toy take a form that resembles a mouse in size, shape and general appearance. It is anticipated that the pet toy improves on a mouse taught in U.S. Pat. No. 6,371,053, to the present inventor and incorporated by reference as if fully rewritten herein, wherein a simulated, cloth mouse comprises a sound chip that emits a prerecorded sound in response to its engagement. While in the prior art, the sound chip is capable of emitting a purr, a meow, a recorded message, etc., the present invention improves on that toy by means of emitting a sound that more closely replicates the ultrasonic vocalizations studied in mice.

According to the results of research conducted on male mice at the Department of Anatomy and Neurobiology at Washington University School of Medicine, male mice emit ultrasonic vocalizations ranging over 30-110 kHz. The vocalizations have the characteristics of song, wherein they consist of several different syllable types having a temporal sequencing that includes an utterance of repeated phrases. The study recorded acoustical power and quantitatively represented it as a function of time and frequency. According to the study, male mice ultrasonic vocalizations consist of a rapid series of "chirp-like" syllables in the 30-110 kHz band, wherein syllables of varying duration (approximately 30-200 ms) are uttered at rates of about ten per second. Most syllables involve rapid sweeps in frequency and relatively sudden, large changes ("jumps") in frequency.

It is an object of the present toy to emit a sound recording that closely replicates this study's results so that the cat's acoustic and visual abilities are engaged. Improvements to the present sound chip are that it cycles a sound longer, it cycles a sound in repeated patterns and it cycles the sound in random patterns.

Figure 1:
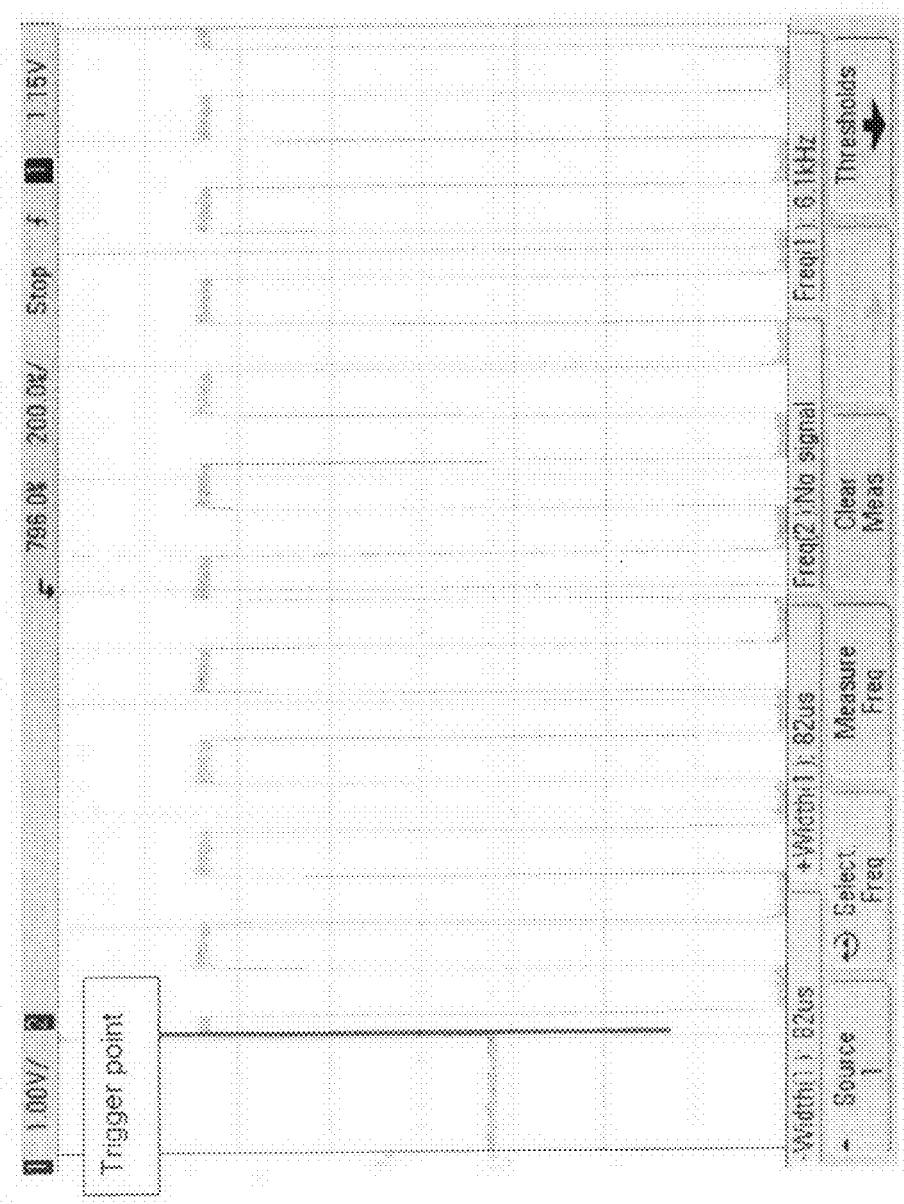
FIG. 1 is an initial waveform of a "squeak" emitted from a prerecorded sound chip comprised in an ultrasonic stimulating pet toy according to a preferred embodiment of the present invention.
Figure 2:
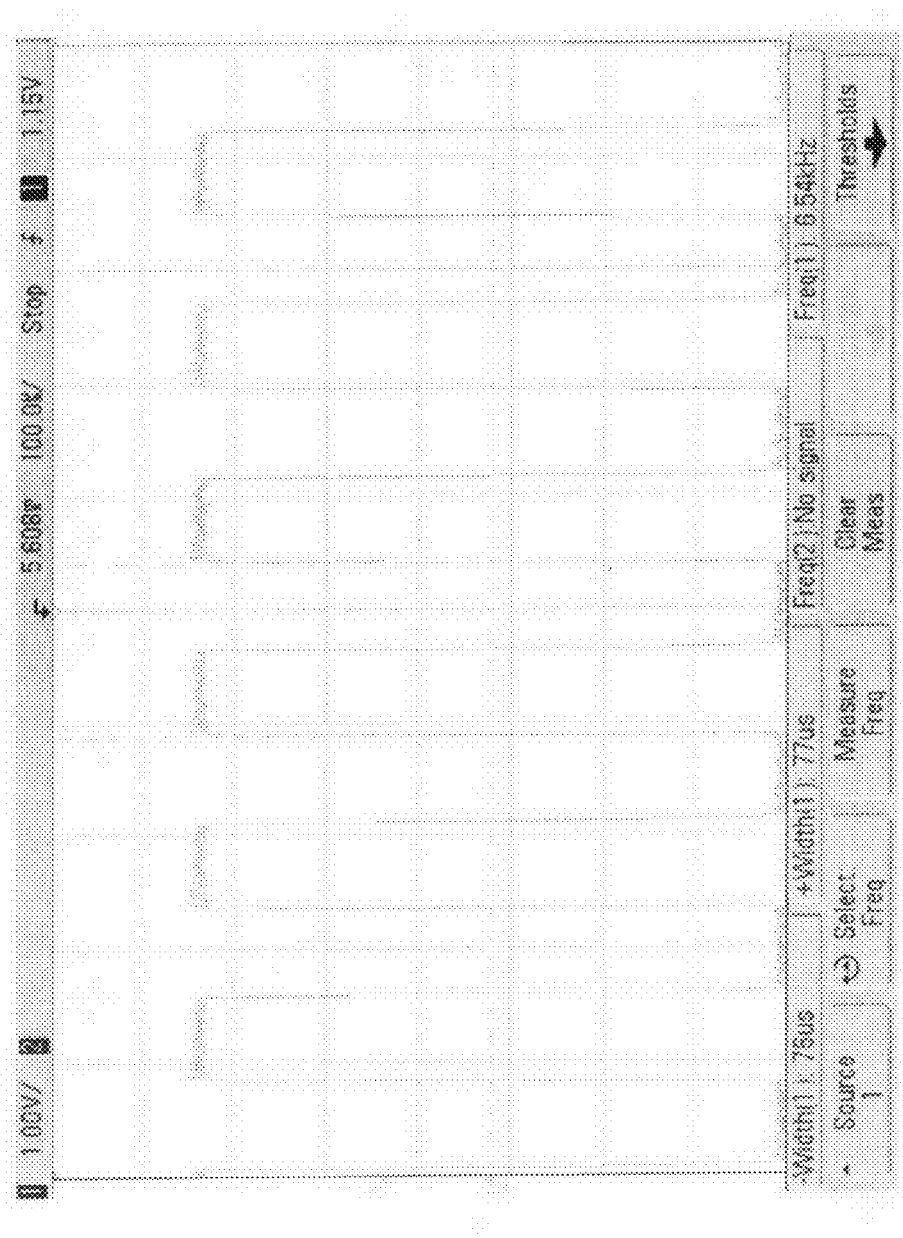
FIG. 2 is a waveform after 5.6 msec elapses.

An analysis of a vocalization ("squeak") of the present invention is shown in FIGS. 1-6. The analysis shows the measurements made to the present mouse-like pet toy when a prerecorded sound chip contained therein emitted a squeak. The squeak is triggered by a motion sensor comprised in the pet toy. One squeak produces an audio waveform that lasts approximately 100 msec. FIG. 1 shows an initial waveform produced by the squeak, wherein the waveform lasts for 5.6 msec. The piezo element is driven by a nominal square wave with a frequency of 6.1 kHz. An amplitude for the wave is shown in FIG. 1 to be 6.4 Vp-p*.

Figure 3:
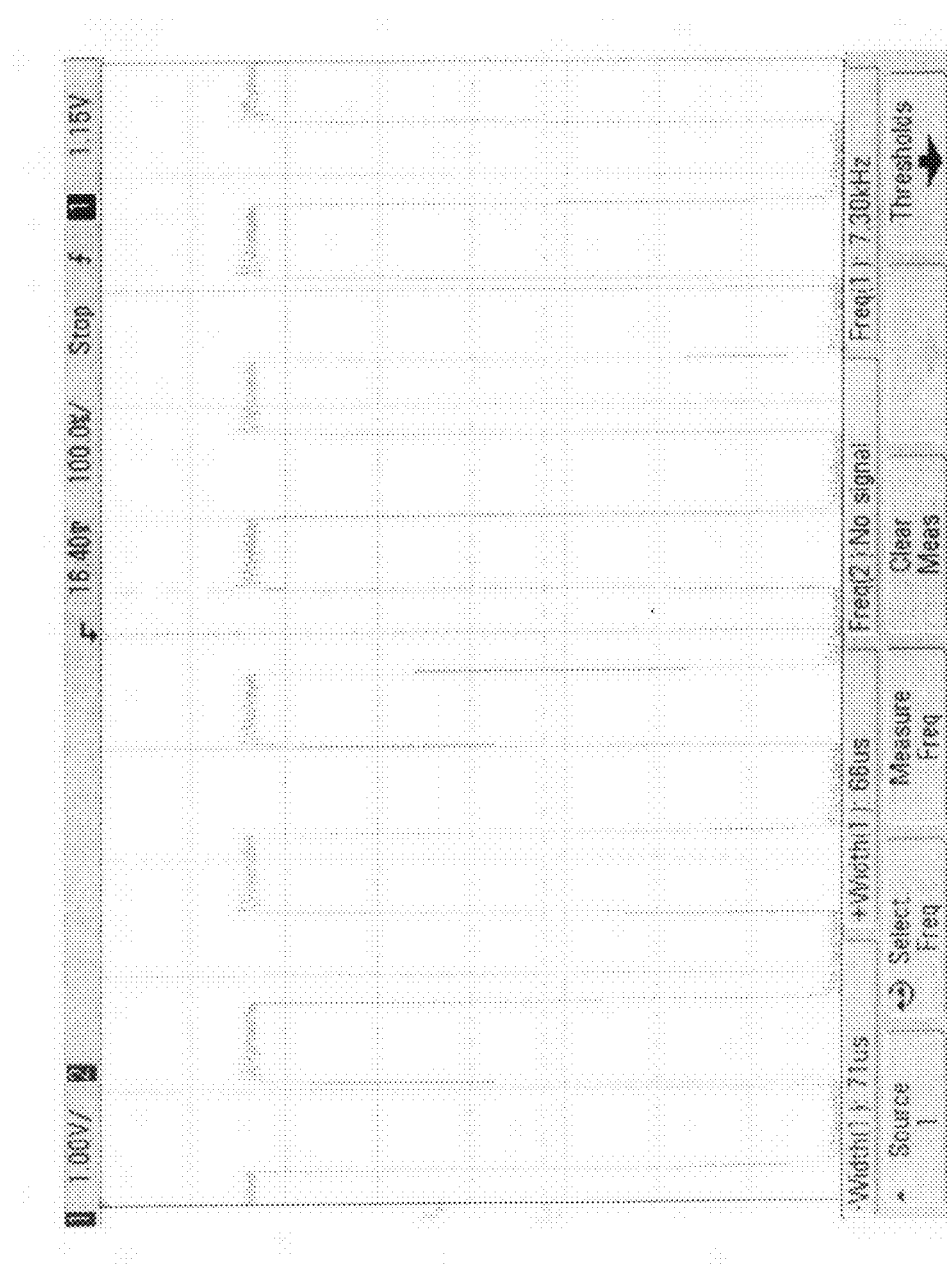
FIG. 3 is a waveform after 28.3 msec elapses.
Figure 4:
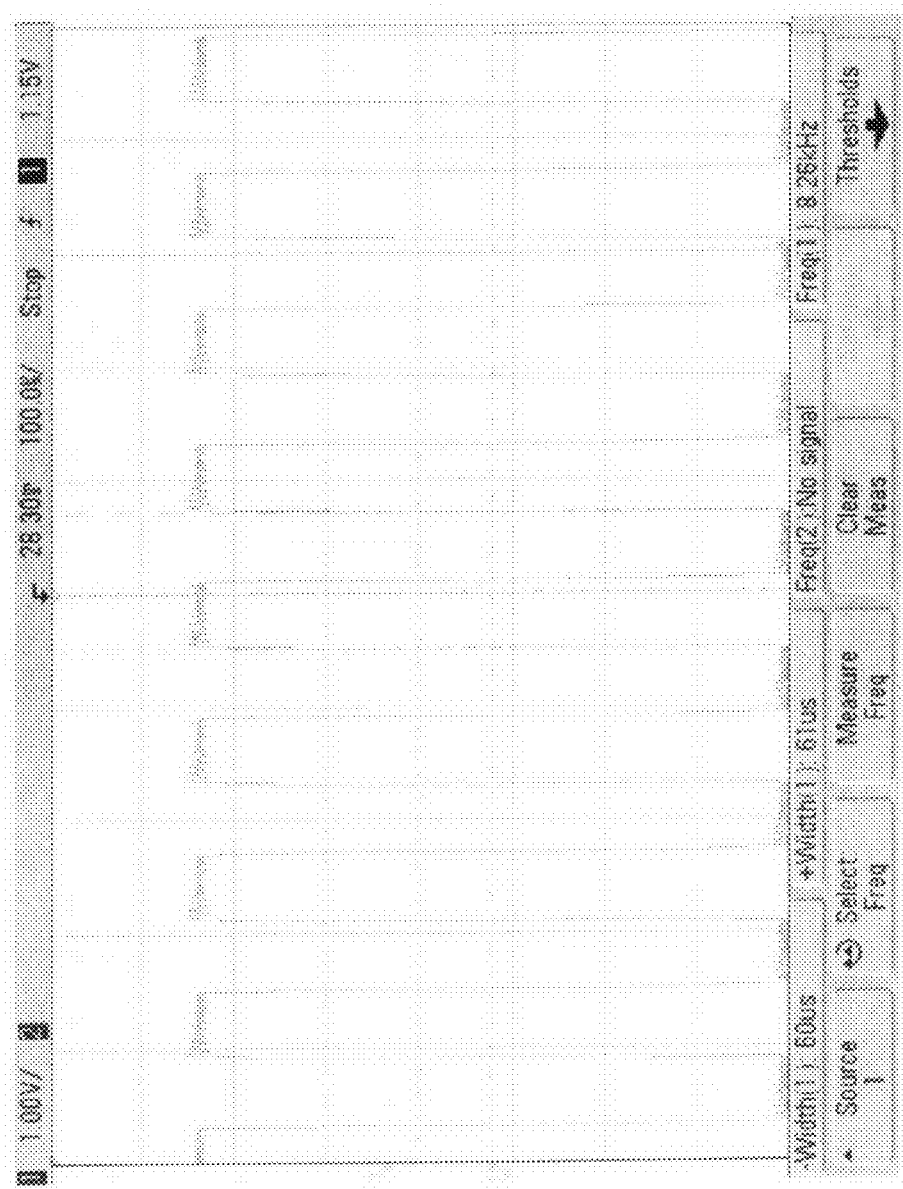
FIG. 4 is a waveform after 28.3 msec elapses.
Figure 5:
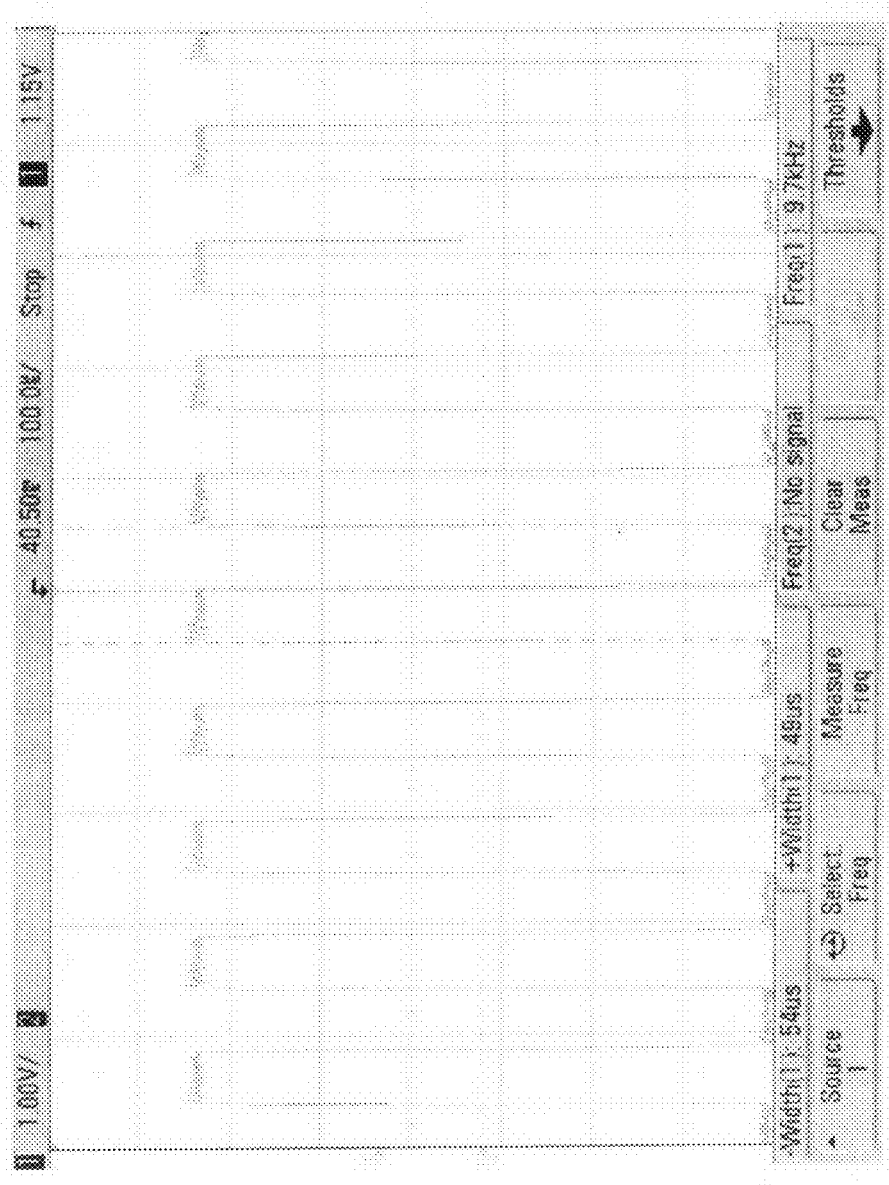
FIG. 5 is a waveform after 40.5 msec elapses.
Figure 6:
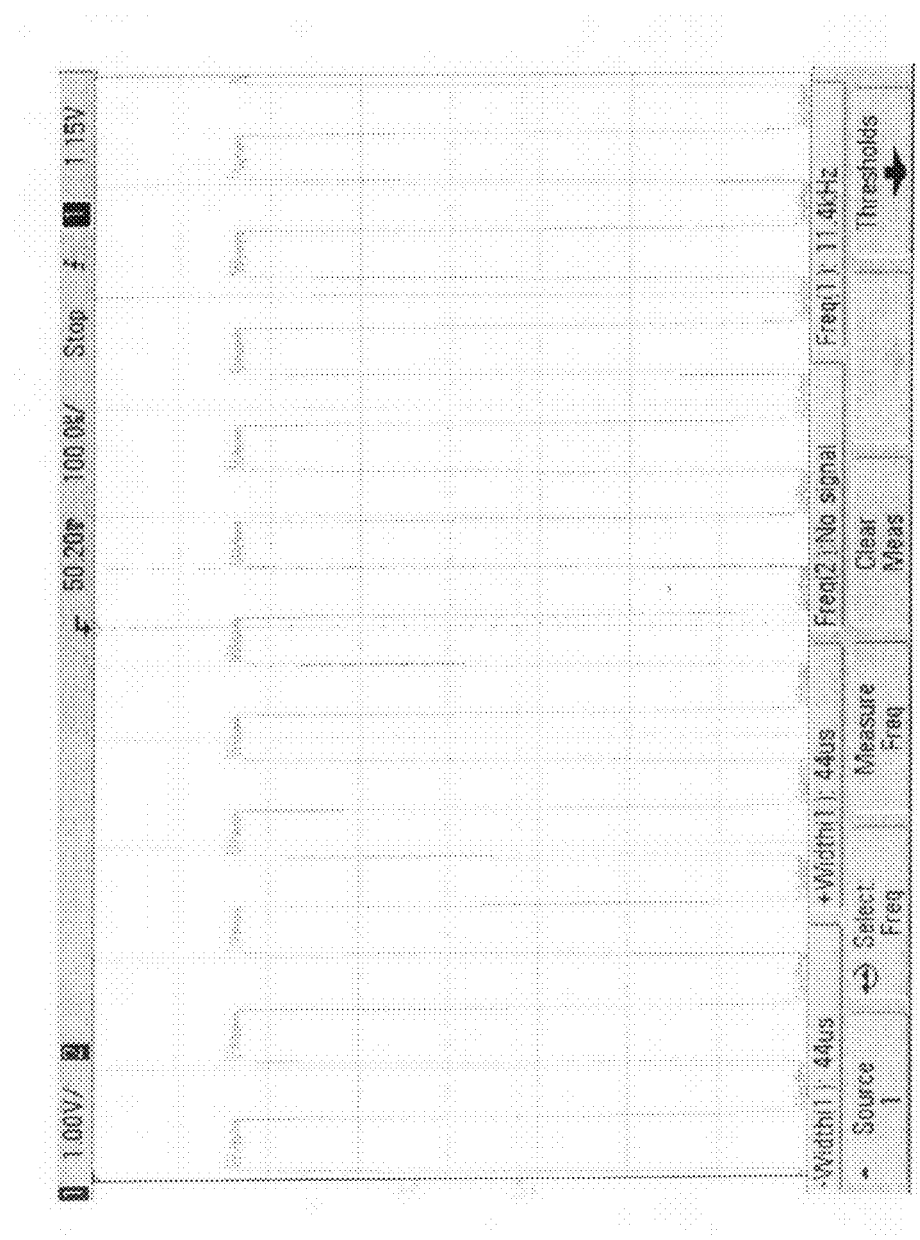
FIG. 6 is a waveform after 50.2 msec elapses.

As time elapses, the frequency increases and decreases. These changes are shown in FIGS. 2-6 and they produce a characteristic "squeak" sound. The frequency at 5.6 msec increases to 6.54 kHz. FIG. 3 is missing. FIG. 4 shows a waveform after 28.3 msec of time elapsed. The frequency increases to 8.26 KHz, at this time. FIG. 5 shows the waveform after 40.5 msec elapses, wherein the frequency increases to 9.7 kHz. The waveform increases to 11.4 kHz, as shown in FIG. 6, after 50.2 msec elapses.

The frequency increases and decreases shown in FIGS. 2-6 are charted in FIG. 7. The graph shown in FIG. 7 charts a representation of the frequency over the time elapsed. In the present toy, it is envisioned that the sound module comprised therein emits a sound recording in the form of an audible squeak every time a motion sensor senses a form of engagement. A squeak approximates 100 msec. FIG. 7 shows the present sound chip retriggered after a completion of the first squeak. FIG. 8 is a graph showing the same representation as that of FIG. 7, except that a frequency over time is represented for only a first squeak.

According to the analysis of the squeak comprised in the present pet toy, an audio amplitude is typically 100 dB at 6 cm (at 7 kHz), wherein a measurement was conducted when the speaker was removed from the toy. The output shows to be very directional and it decreases as the frequency increases.

The piezo element is driven by a bridge circuit, causing it to result in a peak-to-peak voltage across the element of about 6.2 V. The present configurations provide for a higher volume without increasing battery voltage.

It should be noted that the data presented in the present disclosure is considered only typical; however, there are dramatic differences in frequency, in timing and in output levels among a plurality of product samples. It is envisioned that this vocalization is similar to the characteristic syllabic and temporal structures of real mice. In a preferred embodiment, the present toy emits ultrasonic vocalizations that utilize frequencies that approach 30 kHz. In alternate embodiments, it is envisioned that a squeak also consists of a plurality of rapid chirp-like syllables in and audible range.

The foregoing descriptions of the specific embodiments of the present invention are presented for the purposes of illustration and description. They are neither intended to be exhaustive nor to limit the invention to the precise forms disclosed, and obviously many modifications and variations are possible in light of the above teaching. The embodiments are chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and to their equivalents. Therefore, the scope of the invention is limited only by the following claims.

Having thus described the invention what is claimed as new and desired to be secured by Letters Patent is as follows:

1. An ultrasonic stimulating pet toy having a prerecorded sound chip that emits a squeak-like sound that replicates a vocalization of a mouse and having an initial waveform produced by said squeak at a frequency of greater than approximately 6 kHz and less than approximately 12 kHz, wherein said pet toy comprises a motion sensor therein, said sound chip emits said squeak upon a detection by said motion sensor.

2. The ultrasonic stimulating pet toy of claim 1, wherein an amplitude for said waveform is 6.4 Vp-p*.

3. The ultrasonic stimulating pet toy of claim 2, wherein said toy additionally emits ultrasonic vocalizations that consist of a plurality of rapid chirp-like syllables in an audible range.

4. The ultrasonic stimulating pet toy of claim 1, wherein said waveform produced by said squeak approximates 6.54 kHz when 5.6 msec elapses.

5. The ultrasonic stimulating pet toy of claim 4, wherein said waveform produced by said squeak approximates 8.26 kHz when 28.3 msec elapses.

6. The ultrasonic stimulating pet toy of claim 5, wherein said waveform produced by said squeak approximates 9.7 kHz when 40.5 msec elapses.

7. The ultrasonic stimulating pet toy of claim 6, wherein said waveform produced by said squeak approximates 11.4 kHz when 50.2 msec elapses.

8. The ultrasonic stimulating pet toy of claim 5, wherein said toy additionally emits ultrasonic vocalizations that consist of a plurality of rapid chirp-like syllables in a range audible to dogs or cats.

9. The ultrasonic stimulating pet toy of claim 4, wherein said toy additionally emits ultrasonic vocalizations that consist of a plurality of rapid chirp-like syllables in a range audible to dogs or cats.

10. The ultrasonic stimulating pet toy of claim 1, wherein said toy additionally emits ultrasonic vocalizations that consist of a plurality of rapid chirp-like syllables in a range audible to dogs or cats.

11. An ultrasonic stimulating pet toy resembling a mouse in size, in shape and in general appearance having a prerecorded sound chip that emits a squeak-like sound that replicates a vocalization of a mouse, wherein said pet toy comprises a motion sensor therein, said sound chip emits said squeak upon a detection by said motion sensor.

12. An ultrasonic stimulating pet toy having a prerecorded sound chip that emits a squeak-like sound that replicates a vocalization of a mouse and produces an audio waveform that lasts approximately 100 msec, wherein said pet toy comprises a motion sensor therein, said sound chip emits said squeak upon a detection by said motion sensor.

13. The ultrasonic stimulating pet toy of claim 12, wherein said toy additionally emits ultrasonic vocalizations that consist of a plurality of rapid chirp-like syllables in an audible range.

14. An ultrasonic stimulating pet toy having a prerecorded sound chip that emits a squeak-like sound that replicates a vocalization of a mouse, wherein said pet toy comprises a motion sensor therein, said sound chip emits said squeak upon a detection by said motion sensor, wherein said toy emits ultrasonic vocalizations that utilize frequencies that approach 30 kHz.

15. The ultrasonic stimulating pet toy of claim 14 wherein said toy additionally emits ultrasonic vocalizations that consist of a plurality of rapid chirp-like syllables in an audible range.

* * * * *